Edwin et al.
3,841,149
Oct. 15, 1974

[54] TOOL WEAR DETECTOR

[75] Inventors: Allan I. Edwin; Thomas L. Vlach; Melvin T. Bennett, all of Ann Arbor, Mich.

[73] Assignee: Interactive Systems, Inc., Ann Arbor, Mich.

[22] Filed: Jan. 8, 1973

[21] Appl. No.: 322,037

[52] U.S. Cl.................. 73/71.4, 73/104, 235/151.3
[51] Int. Cl. .......................................... G01n 29/00
[58] Field of Search ............... 73/71.4, 70, 71, 71.2, 73/67.2, 67.4, 104, 67.3; 340/267 R; 235/151.3

[56] References Cited
UNITED STATES PATENTS

| | | | |
|---|---|---|---|
| 3,508,254 | 4/1970 | Ross et al. ........................ | 73/71.2 X |
| 3,694,637 | 9/1972 | Edwin et al...................... | 73/71.4 X |
| 3,705,516 | 12/1972 | Reis .................................... | 73/71.4 |
| 3,714,822 | 2/1973 | Lutz.................................... | 73/71.4 |

Primary Examiner—Richard C. Queisser
Assistant Examiner—Stephen A. Kreitman

[57] ABSTRACT

A tool wear detector wherein a tool wear condition which calls for a tool change is determined by establishing a reference value representing the broadband vibrational energy output of the tool during utilization thereof in a relatively unworn condition, maintaining a running average of broadband vibrational energy levels during successive and substantially regular intervals of tool utilization in progressively more worn conditions and comparing the running average to the reference value such that the tool change condition is indicated whenever the running average exceeds the reference value by some predetermined amount. In the illustrated embodiment, the running average is maintained on the basis of ten successive vibrational energy level readings taken at ten discrete intervals during a cutting operation. The vibrational energy level readings are taken by means of an accelerometer producing an analog representation.

10 Claims, 3 Drawing Figures

3,841,149

TOOL WEAR DETECTOR

INTRODUCTION

This invention relates to tool wear detectors of the type wherein a tool wear condition is determined as a function of the change in the level of a selected measurable quantity such as energy associated with the tool during utilization thereof.

BACKGROUND OF THE INVENTION

Numerous tool wear detectors have been developed for use in combination with industrial machine tools, such as gear cutters, drills, lathes, and various turning tools to determine and indicate the optimum point for tool change. Through the use of such a tool wear detector the progressive deterioration of the tool is monitored and a tool change is indicated in such time as to prevent either inferior work products or catastrophic failure.

One type of tool wear detector is based on the principal that the force required to advance the tool through the workpiece increases as the tool is progressively worn. Accordingly, tool wear is indicated as a function of the reaction force between the tool and the workpiece. A patent showing such a tool wear detector is the U.S. Pat. to Wilson No. 3,596,506. A different and more effective approach to tool wear detection involves sensing the vibrational energy which is produced by the tool during utilization thereof and further detecting certain critical changes in the vibrational energy representations, these changes having been empirically determined to be representative of tool wear. A system which operates on this general principle is disclosed in U.S. Pat. No. 3,694,637 to Edwin and Vlach.

The present invention is a tool wear detector which is based on the measurement of an energy level and is, thus, similar in approach to the system disclosed in the Edwin and Vlach patent, identified above. However, the present invention differs from the prior system in its measurement of energy level on a broadband frequency basis rather than the detection of energy level changes in relatively narrow, discrete frequency bands.

BRIEF STATEMENT OF THE INVENTION

The tool wear detection method and apparatus of the present invention has for its general objective the determination of an optimum tool change condition based on a predetermined change in a tool operating quantity such as energy level between a relatively unworn condition of the tool and a more worn condition of the tool. In general, the tool wear detection method involves the establishment of a reference value which is based on a quantity such as the vibrational energy produced by the tool in a relatively unworn condition. By "relatively unworn" we mean to include both new, resharpened and partially worn tools, the advantages of the present invention being equally applicable to all of these. The method further involves the step of maintaining a running average of tool energy level values taken during substantially regular and successive points during the utilization of the tool and, thus, representing progressively more worn conditions. The tool change point is indicated whenever the running average exceeds the reference value by some predetermined amount.

The implementation of the invention involves the use of a suitable transducer such as an acceleratometer capable of producing an analog representation of a selected quantity such as vibration in the form of an electrical voltage. The rms average of such voltage is proportional to the broadband vibrational energy level produced by the tool during use. The conversion of vibration to energy can also be accomplished by power spectral analysis as is more fully set forth in the U.S. Pat. No. 3,694,637, mentioned above. The implementation of the invention, in the preferred form, further involves the conversion of the analog vibrational signal to digital form and the sampling of the digital signal at discrete times to produce the reference value as well as to maintain the running average of successively taken digital samples. Means, such as a comparator, are included for the purpose of comparing the running average of energy to the reference value and for determining the instant at which the running average exceeds the reference value by some predetermined degree. In addition, it is desirable to monitor substantially the instaneous energy level to detect any substantial variations therein from normal so as to anticipate a catastrophic failure.

The method and apparatus of the present invention will be best understood by reference to the following specification which describes a preferred, but illustrative embodiment of the invention in detail.

DETAILED DESCRIPTION OF THE SPECIFIC EMBODIMENT

Figure 1:
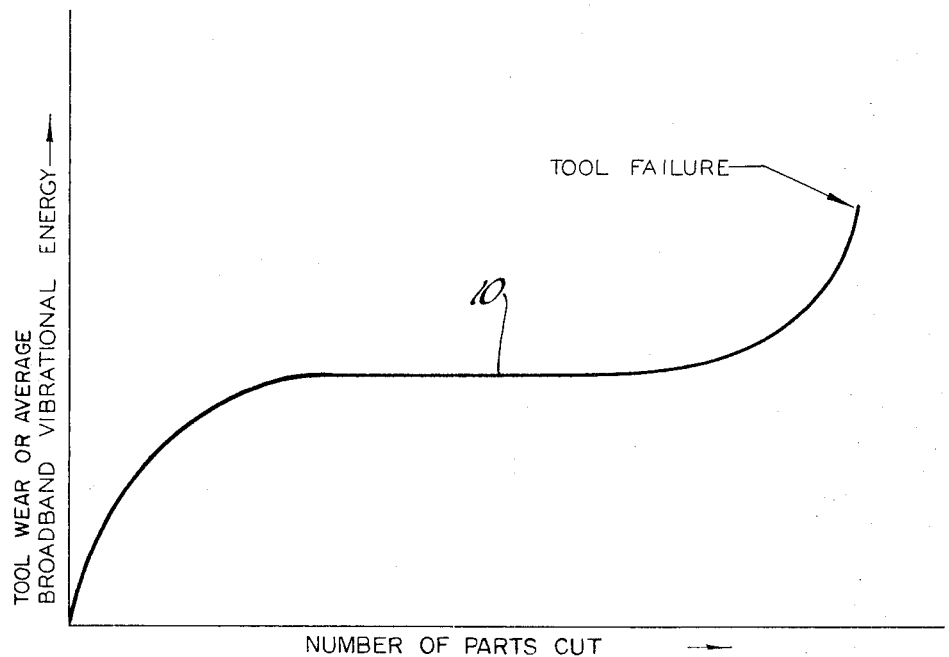
FIG. 1 is a plot of the number of parts cut versus tool wear or averaged broadband vibrational energy level for a typical tool, such as a gear cutter.

Referring to FIG. 1, there is shown a typical plot or graph of number of parts cut versus the tool wear or broadband vibrational energy produced by the tool during utilization thereof; i.e., engagement of the tool with the workpiece in a productive fashion. The curve 10 is, of course, highly idealized and may be taken as representing a curve which is drawn through a large number of individually measured points, most, if not all, of which fall to one side or the other of the curve. Curve 10 is, however, representative of the fact that the broadband vibrational energy, which may be sensed as being produced by the tool during utilization thereof, is characterized by a steeply rising initial portion followed by a long, relatively flat center portion followed by an exponential or near exponential increase in the total vibrational energy as the tool approaches the failure point. This characteristic is typical of most industrial cutting tools for metal removal.

Figure 2:
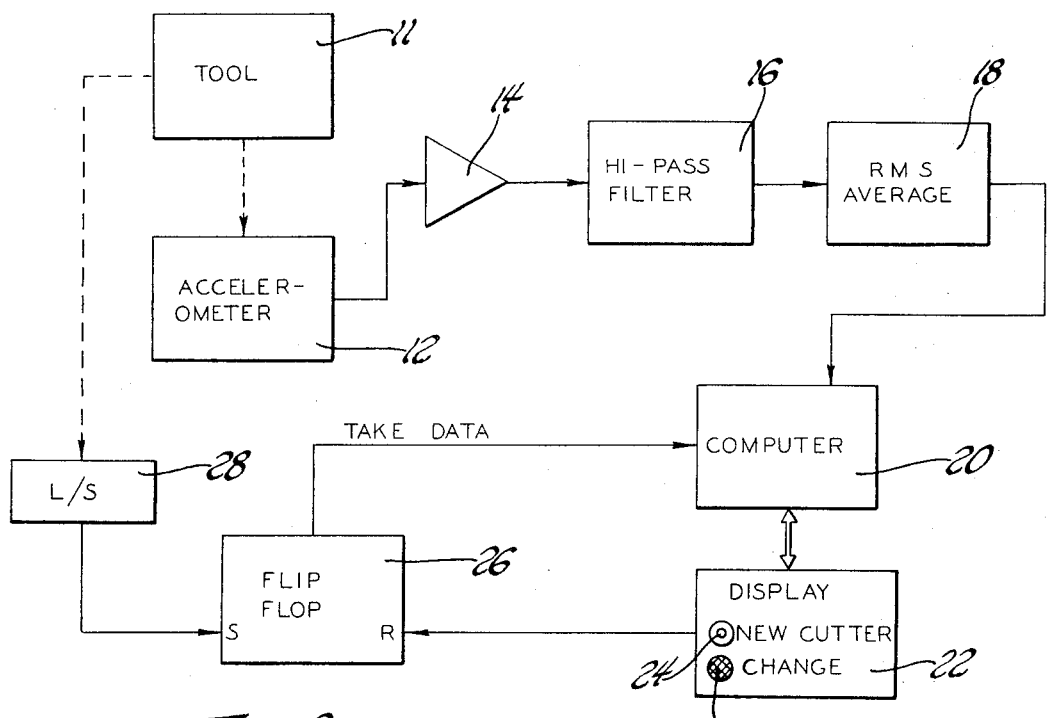
FIG. 2 is a block diagram of an apparatus for carrying out the invention.

Looking now to FIG. 2, a block diagram of an apparatus for carrying out the invention is shown to include a tool 11 such as a gear tooth cutter. The tool 11 is mechanically connected to an accelerometer 12 which produces an electrical signal which is an analog representation of the broadband vibrational energy produced by the tool 11 during utilization thereof. The electrical analog signal produced by the accelerometer 12 has a frequency range of approximately 0 to 20,000 Hz. The accelerometer 12 and its association with the tool 11 may be similar to that disclosed in the aforementioned Edwin and Vlach U.S. Pat. No. 3,694,367. The broadband vibrational energy signal from the accelerometer 12 is applied to an amplifier 14 and, thence, to a high pass filter 16 which eliminates the dc component. The frequency range in the electrical output signal from the high pass filter is approximately 10 to 4,500 Hz.

The output of the filter 16 is applied to an rms averaging circuit 18 the output of which is a variable dc signal which varies between 0 and 10 volts in the specific embodiment in accordance with the rms average of the vibration reading from the accelerometer 12. The output of the averaging circuit 18 is applied to a special purpose computer 20 which operates to sample the signal every 2 milliseconds for 1 second. The computer, thus, obtains 500 samples and averages those samples to produce a single reading. In the case of a gear cutter, the reading which comprises the 500 samples is typically taken in the middle of a cut; i.e., in the middle of the cutting of a first tooth in any given gear being formed by the tool 11 on a gear cutter machine. Computer 20 typically involves a digital computing apparatus and, accordingly, the conversion of the analog signal from the accelerometer 12 to a digital form is required.

Computer 20 is interconnected with a display panel 22 which includes a push button 24 which is depressed each time a new cutter is placed in the tool 11. When the push button 24 is pressed, a flip-flop 26 is reset to apply a "take data" signal to the computer 20. The flip-flop 26 is reset by means of a limit switch 28 which is mechanically interconnected with the tool 11 and which is tripped whenever the first tooth of the first gear cut by the new cutter is finished. Display panel 22 also includes a change cutter light 30 which provides a visual indication whenever the optimum tool change point is reached as determined by the output of the computer 20. In accordance with the present invention, the tool change condition is indicated whenever the average of the last 10 readings taken by the computer 20 during substantially regular and successive tool wear intervals exceeds an initial reference value by at least 15 percent. The initial reference value may be established as a function of the average of the first 10 readings taken by the computer 20. These figures are, of course, given by way of illustration and it is to be understood that other figures for other types of tools and other industiral applications will apply. Accordingly, these figures are not to be construed as limiting factors in the use of the subject invention.

More specifically, the reference value is obtained by averaging the broadband vibrational energy level signals of the first 10 gear cutting readings. A tool change condition is established by adding to this reference value an increment of 15 percent of the 10 reading average. The reference value plus the 15 percent increment may be called a "cutoff" value. Accordingly, a 15 percent increase in total average vibrational energy will thereafter indicate the need for a tool change. After the reference value and the tool change condition have been preestablished, the figure or value which is actually compared to the cut off value to determine whether or not the 15 percent increase has been realized is calculated on the basis of a running average of the last 10 readings taken by the computer 20. As the 11th cut is made, the first cut reading is dropped from the running average; as the 12th reading is taken, the second cut reading is dropped from the current average and the current vibrational energy level figure is continuously updated before it is compared to the cut off value to determine whether or not the tool change point has been reached. As soon as the average of the last 10 readings exceeds the reference value by at least 15 percent, i.e., the cut-off value has been reached, the change cutter light 30 in the display panel 22 is actuated.

It is to be particularly noted that the method of the present invention, as described above, permits the tool 11 to establish its own reference value. Moreover, the reference value may be established at any point in the life of the tool; i.e., it may be set or reset at any tool wear condition ranging from new to substantially worn. If the reference value is established when the tool is new, then the 15 percent increase in total vibrational energy required to indicate the need for a tool change will not be reached until a substantial number of readings, based on a substantial number of cuts, have been taken. If, on the other hand, the initial or reference value is established when the tool is in a relatively worn condition, in other words when the tool is already on the steep portion of the curve 10 in FIG. 1, then the "tool change" condition or cut off value will be typically reached quickly; e.g., in the next 10 readings. Accordingly, the method of the present invention is substantially fool-proof and cannot be defeated simply by inadvertently establishing a reference value which corresponds to a worn tool condition.

In FIG. 2, the instantaneous value of the rms averaged signal is also compared to high and low limit values in computer 20. This may be regarded as a secondary examination to prevent a catastrophic failure, such failure being indicated by a wide departure from normal in the rms average signal value. Such a test may also indicate a failure of the accelerometer 12 or an open circuit condition somewhere in the input section which includes the accelerometer.

Figure 3:
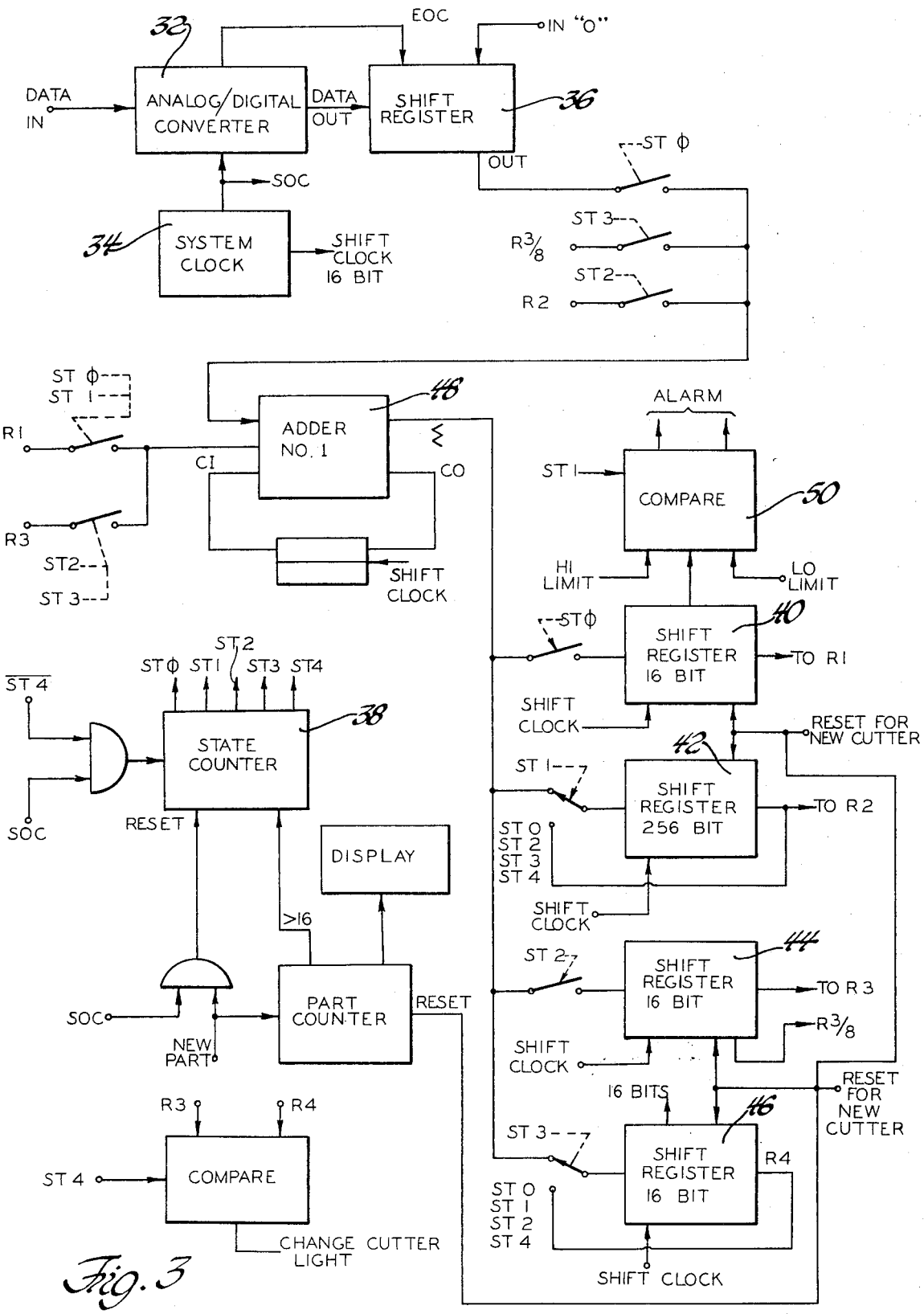
FIG. 3 is a more detailed circuit diagram of an apparatus embodying the invention and capable of carrying out the objectives thereof.

Looking now to FIG. 3, there is shown a detailed circuit diagram for an apparatus which essentially fulfills the requirements for the computer 20 in the less detailed system representation of FIG. 2. All of the parts or blocks shown in FIG. 3 are well known state-of-the-art devices and, accordingly, no detailed description of the individual elements will be given. In addition, the signal designators which are shown adjacent the various signal lines in FIG. 3 follow, for the most part, standard logic rules and it will be readily apparent to those skilled in the electronics and logic arts how the system of FIG. 3 operates. However, for clarity some detailed explanation of operation will be given. In this explanation or description it is to be understood that the "SOC" signal indicates the "start of count" and the "EOC" signal indicates the "end of count."

Referring specifically to FIG. 3, an eight-bit analog-to-digital converter 32 continuously takes readings of the tool vibrational energy as represented by the rms average of the output of the accelerometer 12 in FIG. 2. The clock and timing signals for the signals are generated by the system clock 34 which controls the shifting of data in the system and in the analog-to-digital converter 32. No shift pulses are generated when the converter 32 is converting and, conversely, the converter 32 does not convert when the shift pulses are being generated. The converter 32 starts converting when it receives an SOC pulse from the system clock 34. The data from the converter 32 is loaded into an eight-bit shift register 36 with the end-of-conversion signal. During this time, the state counter 38 is stopped with the state No. 4 (ST4) actuated.

The new cutter signal clears all of the shift registers 40, 42, 44, and 46. When the "new part" signal is received, the state counter 38 is set to state 0. During this state 16 converter readings; i.e., data output signals from the converter 32, are added together in adder 48 and the sum is shifted into the 16-bit shift register 40. The state counter 38 is then stepped to state 1 after the 16 readings have been taken.

In state 1, a comparison is made between a high and low limit setting in the comparator 50, these settings having been previously established by conventional means, such as thumb-wheel switches. If the limit is exceeded either high or low, an alarm signal is set. In addition, during state 1 the sum in shift register 40 is shifted to the 256 bit shift register 42. The state counter then goes to state 2 at the end of the shift of data from register 40 to register 42.

In state 2, all of the 16-bit words in shift register 42 are added together with the sum going to the next shift register 44. If the part counter is less than 16, the state counter then shifts to state 3. If the sum is 16 or greater, the state counter goes directly to state 4. In state 3 the sum value in shift register 44 is added together with 15 percent of its value and the sum is placed in shift register 46. The state counter is then stepped to state 4.

A comparison is made in state 4 between the contents of shift registers 44 and 46. If the contents of shift register 44 is less than that of shift register 46, the state counter simply remains in place in anticipation of a new part signal and then goes to state 0 to start the sequence over. If the contents of shift register 44 are greater than the contents of register 46, the "change cutter" signal is generated to turn on the light 30 in the display panel 22 of FIG. 2. The state counter then waits for a "new cutter" signal. The new cutter signal again clears all the shift registers and when the new part signal is received, the state counter will be stepped to state 0 and the sequence will start over.

It is to be understood that the steps of the method of the present invention basically involve the establishment of a reference value which is taken as the average over some small, predetermined number of tool utilization readings. The term "tool utilization readings" refers to the measurement of a signal quantity which is associated with the operation of the tool and having a characteristic which changes with tool wear according to a pattern which substantially follows the curve shown in FIG. 1. In the illustrative embodiment, this signal quantity is vibration energy, but it is to be understood that other signal quantities associated with tool utilization may also be measured. Typically, these readings are taken just after the cutter is renewed. Subsequent tool utilization readings are then taken and the running average of a predetermined number of such readings is compared to the reference value or to the reference value plus some predetermined percentage increment, depending upon the specific implementation of the system. If the running average exceeds the initial value by the predetermined percentage increment, the tool change condition is assumed to have been reached and a suitable indication is given. This method may be implemented in apparatus other than that described above with reference to FIG. 3 as will be apparent to those skilled in the art.

The embodiments of the invention in which an exclusive property or privilege is claimed are defined as follows:

1. Apparatus for detecting a tool wear condition comprising: input means for obtaining signals representing discrete values of the energy level of a signal quantity produced during operation of the tool, first means for establishing a reference value representing the energy of the tool in a first relatively unworn condition, second means connected to said input means for maintaining a running average of a predetermined number N of said signals taken at substantially regular and successive intervals during utilization of the tool, and output means for producing an indication when said running average varies from said reference value by a predetermined amount.

2. Apparatus as defined in claim 1 where N is on the order of 10.

3. Apparatus as defined in claim 1 wherein said output means is actuated whenever said running average is approximately 15 percent greater than said reference value.

4. Apparatus as defined in claim 1 wherein said input means produces an electrical signal which is an analog representation of vibration energy levels.

5. Apparatus as defined in claim 4 including means for monitoring the dc level of said analog signal to indicate an incipient catastrophic condition.

6. Apparatus as defined in claim 4 including means to convert said analog signal representation to digital form, said analog-to-digital converter means being connected between said input means and said second means.

7. Apparatus as defined in claim 4 wherein said input means comprises an accelerometer.

8. A method of detecting a tool wear condition comprising the steps of: establishing a reference value of energy produced by the tool during utilization thereof in a relatively unworn condition, measuring vibrational energy levels produced by the tool at successive regularly spaced intervals during utilization thereof in progressively more worn conditions, calculating a running average of said vibrational energy levels, comparing a representation related to the average to the reference value, and generating an indication when the average varies from the reference value by at least some predetermined amount.

9. A method as defined in claim 8 wherein the step of establishing a reference value of energy includes the further steps of attaching an accelerometer to the tool and operating the accelerometer to produce an analog signal representation of the vibration level produced by the tool.

10. The method defined in claim 9 wherein the step of calculating the running average includes the further step of converting the analog signal representations of the accelerometer to digital form.

* * * * *